United States Patent

[11] 3,631,279

| [72] | Inventors | Alexander E. Bozsvai<br>Solon;<br>Harvey A. Trickel, Cleveland, both of Ohio |
|---|---|---|
| [21] | Appl. No. | 11,517 |
| [22] | Filed | Feb. 16, 1970 |
| [45] | Patented | Dec. 28, 1971 |
| [73] | Assignee | The Reliance Electric Company |

[54] DYNAMOELECTRIC MACHINE BLOCKING MEANS
15 Claims, 2 Drawing Figs.

[52] U.S. Cl. .................................................. 310/260, 310/270
[51] Int. Cl. .................................................. H02k 3/50
[50] Field of Search .................................... 310/260, 270; 29/596.8

[56] References Cited
UNITED STATES PATENTS

| 2,994,735 | 8/1961 | Marshall .................. | 310/260 X |
| 3,293,472 | 12/1966 | Stevens .................... | 310/260 |
| 3,027,476 | 3/1962 | Coggeshall ............... | 310/260 |

FOREIGN PATENTS

| 894,481 | 4/1962 | Great Britain ........... | 310/270 |

Primary Examiner—D. X. Sliney
Attorney—Woodling, Krost, Granger and Rust

ABSTRACT: The support for the end turns of windings of a dynamoelectric machine is provided by blocking means which includes both rigid and conformable blocking. In one embodiment the conformable blocking is in a form like felt and is partially wrapped around a block to provide ready insertion of the blocking means between adjacent end turns which extend out of slots in a magnetic core of the dynamoelectric machine. The conformable blocking is initially unimpregnated and later the entire blocking means is dipped in varnish and baked to provide rigid blocking means between adjacent end turns.

PATENTED DEC 28 1971

3,631,279

INVENTORS.
ALEXANDER E. BOZSVAI
HARVEY A. TRICKEL
BY Woodling, Krost,
Granger and Rust
ATTORNEYS.

3,631,279

DYNAMOELECTRIC MACHINE BLOCKING MEANS

BACKGROUND OF THE INVENTION

In dynamoelectric machines especially the larger sizes, the coil heads or end turns which extend out of the slots of the magnetic core, either in the rotor or stator, require support means to hold them rigid against forces exerted thereon either by centrifugal force in the case of rotor or by changing currents in the conductors of the coil for both rotor and stator. The prior art has known may forms of support means including lashing the end turns to encircling support rings but this takes considerable time to provide such lashing to rigidly support the end turns. Other forms of the prior art have included rigid blocks inserted between adjacent end turns at or about the time of lashing the end turns together or to an annular support ring. These rigid blocks have not been satisfactory because the installer has a selection of only limited number of thicknesses of rigid blocks. Accordingly when the installer comes to the last few turns in the circumference to be supported, the turns may be too close together to permit insertion of rigid blocks. Still another prior art form of support means was with conformable packing material between each pair of adjacent end turns with this conformable material being preimpregnated with a resin or other varnish. Usually the conformable blocking was partly cured to make it easier to handle, but it still remained tacky and thus difficult to insert the full depth between adjacent end turns. Also, the spacing between adjacent end turns varies considerably around the circumference and different thicknesses of felt or other conformable blocking was required in order to properly support the end turns. Other prior art forms included hidden knuckle supports which could be a varnish impregnated rope inside the knuckle, which is the very end loop of the end turns. A variation of this was a molded and hardened plastic encasing such knuckles. In either of these last two forms the integrity of the entire system had to be broken in order to replace a particular coil and this means that the integrity of the support means was destroyed.

Accordingly, an object of the invention is to provide support means for the windings of a dynamoelectric machine which obviates the above-mentioned disadvantages.

Another object of the invention is to provide a method of providing blocking means for end turns of a dynamoelectric machine.

Another object of the invention is to provide an easier method of inserting blocking between end turns of a dynamoelectric machine wherein the blocking may be readily inserted and yet which readily conforms to the variable spacing between such end turns.

Another object of the invention is to provide blocking means for the end turns of a dynamoelectric machine wherein the blocking means is a combination of rigid and conformable material.

Another object of the invention is to provide blocking means to support end turns of a dynamoelectric machine wherein rigid blocks are provided to aid insertion of nonimpregnated conformable blocking with varnish later absorbed by the conformable blocking to become rigid and thus conformable to the variable spacing between the end turns without creating stress points on the conductors.

SUMMARY OF THE INVENTION

The invention may be incorporated in a member for a dynamoelectric machine having a magnetic core with slots containing windings, the windings having end turns extending out of and end of the slots, and means for supporting said end turns comprising, blocking means, said end turns being spaced apart in a circumferential direction, said blocking means being placed between said spaced apart end turns, said blocking including rigid blocks each having a thickness less than the spacing between adjacent end turns, said blocking means also including conformable absorbent blocking having a compressed thickness less than the spacing between adjacent end turns and positioned between adjacent end turns, and an impregnating varnish impregnating said conformable material and hardened in place and holding captive at least part of said rigid blocks.

Other objects and a fuller understanding of the invention may be had by referring to the following description and claims, taken in conjunction with the accompanying drawings.

DESCRIPTION OF THE PREFERRED EMBODIMENT

Figure 1:
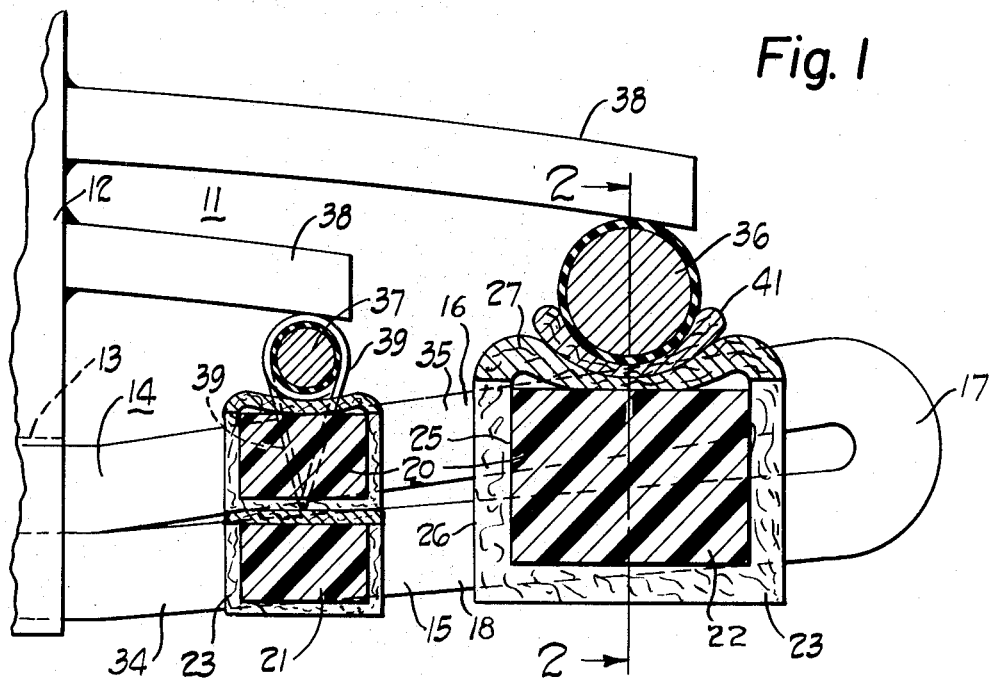
FIG. 1 is a longitudinal sectional view through a dynamoelectric machine having support means of the invention.

In the preferred embodiment described below the support means for the end turns of a dynamoelectric machine are described in connection with a large dynamoelectric machine; however, the support means may be simplified for use with smaller sizes of dynamoelectric machines. The dynamoelectric machine may be a generator or may be a motor 11 as shown in the drawing. The motor 11 has a magnetic core 12 with slots 13 to contain windings 14. The magnetic core may be either the rotor or may be the stator as shown. The windings 14 include a plurality of coils with coil heads or end turns 15 extending out of an end of the slots 13. In the usual form of such windings 14 the coil side in a particular slot may occupy approximately half the depth of the slot, and then make a bend of about 30°, for example, out of the plane of FIG. 1, and make another bend of about 30° out of the plane of FIG. 1 at a point 16, then make a 180° turn for a knuckle 17. The end turn makes another blend of approximately 30° out of the plane of FIG. 1 at a bend point 18 and extends to a different point on the periphery of the magnetic core 12 to bend and enter another slot. The present invention provides support means 20 for these coil heads or end turns to hold them rigid against the forces developed therein by centrifugal force, where applicable, and by the force of the changing currents in the conductors. The support means 20 includes blocking means 21 which includes generally rigid blocks 22 and conformable blocking 23.

Figure 2:
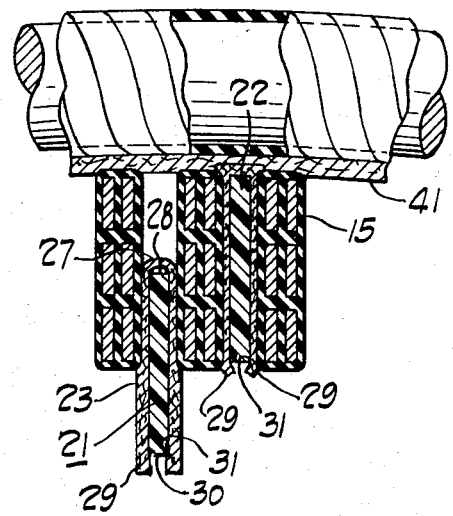
FIG. 2 is a sectional view on line 2—2 of FIG. 1.

Referring first to the blocking means 21 at the knuckle 17, FIGS. 1 and 2 show both the method of insertion and the blocking means as put in place. The rigid blocks 22 are preferably rectangularly solid pieces of insulation. These may be molded to size or may be cut to size as desired and, for example, may all be of the same dimensions of length and width but a range of thicknesses will be provided the installer because the spacing between adjacent end turns 15 will vary around the circumference of the motor 11.

The conformable blocking 23 is preferably feltlike material which is flexible, absorbent and nonimpregnated with varnish at the time of installation. This may be glass fiber, cloth, glass fiber felt, or other felt or clothlike material meeting the temperature rise requirements of the dynamoelectric machine. Preferably the conformable blocking has interstices to absorb resin or other varnish during the subsequent dipping process step. As shown in FIGS. 1 and 2 the conformable blocking 23 preferably has a width dimension greater than the width of the rigid block 22 to overlie the edges 25 of the block at portions 26. Also the conformable blocking 23 has a length approximately 2½ to 3 times the length of the rigid blocks 22 so that the feltlike conformable blocking may be wrapped around the rigid blocks 22 in a U-shape with the bight 27 of the U-shape being at the leading edge or shoulder 28 of the rigid block 22. The ends 29 of the conformable blocking 23 will overlie the trailing edge 30 of the rigid block 22. The conformable blocking 23 may be provided in a range of thicknesses or alternatively the installer may use two, three, four or more thicknesses of the conformable blocking where required because of an extra large space between adjacent end turns.

As best shown in FIG. 2, the blocking means 21 may readily be inserted in the space between adjacent end turns by the installer wrapping a piece of conformable blocking 23 around a rigid block of appropriate thickness and inserting this blocking means between the adjacent end turns. The rigidity of the rigid blocks 22 readily permit this insertion and the yieldability of the conformable blocking 23 also aids this insertion. Preferably the thickness of both blocks 22 and 23 are chosen so that conformable blocking 23 is slightly compressed as it is being inserted. This permits the blocks to be retained in place merely by friction so that they will not fall out and need to be lashed in place.

The selection of the thickness of the rigid block 22 and the conformable block 23 for any particular space will be dictated by the fact that the combined thickness of the two blocks in an uncompressed state of the conformable block is greater than the available space, yet the compressed thickness is less than the dimension of the space. This assures that upon being inserted the combined blocks will cause a compression of the resilient conformable blocking 23 and thus frictionally hold this combination in place for the subsequent steps of dipping and baking. Also, the cushioning of the conformable blocking between the rigid blocks and the adjacent end turn prevents damage to the insulation on the end turns. Also this eliminates stress points on the insulation of the end turns which was a defect of the prior art system of using rigid blocks which had to be forced into place especially for the last few blocks being installed. In the prior art form of using only rigid blocks, this made an arch-bound construction and of necessity the blocks had to be forced tightly in place to achieve this arch-bound structure. Because the surfaces of the insulation on the end turns is not perfectly smooth, and because the inside radial edges are spaced closer together than the outside radial edges, this made the blocks looser at the outer circumference than at the inner circumference. This also increased the possibility of high stress points at the inner circumferential edge. This has been eliminated by the present blocking means.

The rigid blocks, being generally rectangular, have corners or shoulders around which the conformable blocking partly extends. After dipping the complete assembly in varnish and baking, the entire conformable blocking becomes rigid and these ends 29 of the previously conformable blocking are now rigid to quite securely hold the entire blocking means 21 in place without movement.

FIG. 1 also shows that the end turns have a long axial length and the lower or inner circumferential run 34 of the end turns may also be provided with the blocking means 21 between adjacent end turns. Similarly the outer circumferential run 35 of the end turns 15 may also be provided with this blocking means 21. Insulated steel annular bracing rings 36 and 37 are provided in this preferred embodiment to lie adjacent a periphery of the end turns. In this case they are shown on the outer circumference as supported by support arms 38 extending from the magnetic core 12. These rings are especially useful in the larger machine sizes. These rings 36 and 37 are a part of the support means 20 and where desired lashing 39 may be provided to secure the upper run 35 of the end turns to these support rings 36 and 37. Conformable insulation 41 may be placed between the rings 36 and 37 and the end turns 15 for cushioning and more insulation. The blocking means 21 adjacent the support rings 36 and 37 may be inserted in a radial direction either radially inwardly or radially outward, whichever is easiest. At the knuckle 17, the blocking means 21 may be inserted in a radial direction or in many cases it will be inserted in an axial direction from the end of the knuckle.

The use of conformable nonimpregnated fibrous or matlike materials permits easier installation between adjacent end turns. The reason for this is that the nonimpregnated material is generally slippery and readily slides between the end turns even where the conformable blocking 23 is considerably compressed. In contradistinction the prior art form of using only conformable blocking between adjacent end turns and with this feltlike material preimpregnated, the varnish impregnation made the blocking material tacky and hard to insert. The installer had to use a tool to obtain this insertion and it was still hard to do because the tackiness made the blocking material stick to the insulation of the end turns rather than readily sliding in place.

Dipping or otherwise impregnating after complete assembly means that the entire support means may readily be quickly put in place and then the varnish dipping with resin or other material may be utilized which is 100 percent solid impregnation material so that a completely homogeneous structure is achieved regardless of the dipping varnish used. The present system eliminated the necessity for a hidden knuckle support system or a molded system which makes replacement of a particular coil most difficult. In such system the annular support ring had to be cut to permit removal and reinsertion of a new coil and in such case the integrity of the support system was destroyed. In the present case the blocking means may be broken out between adjacent end turns so that a given faulty coil may be replaced.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A member for a dynamoelectric machine having a magnetic core with slots containing windings, the windings having end turns extending out of an end of the slots, and means for supporting said end turns comprising,
   blocking means,
   said end turns being spaced apart in a circumferential direction,
   said blocking means being placed between said spaced-apart end turns,
   said blocking means including rigid blocks each having a thickness less than the spacing between adjacent end turns,
   said blocking means also including conformable absorbent blocking having a compressed thickness less than the spacing between adjacent ends turns and positioned between adjacent end turns,
   said conformable blocking being an absorbent pad of homogeneous material substantially free of varnish at the time of installation,
   and an impregnating varnish impregnating said conformable material and hardened in place and holding captive at least part of said rigid blocks.

2. A member as set forth in claim 1, wherein the combined rigid block and a conformable absorbent blocking has an uncompressed thickness greater than the spacing between adjacent end turns and a compressed thickness less than the spacing between the respective adjacent end turns.

3. A member as set forth in claim 1, wherein said rigid blocks are each generally a rectangular solid.

4. A member as set forth in claim 1, wherein said conformable material is bent into a U-shape around a respective rigid block.

5. A member as set forth in claim 1, including a rigid block between each adjacent pair of end turns.

6. A member as set forth in claim 1, including conformable blocking between each adjacent pair of end turns.

7. A member as set forth in claim 5, including conformable blocking between each adjacent pair of end turns and covering at least one side of each said rigid block to aid in holding captive said rigid blocks.

8. The method of using blocking means for supporting the end turns of windings of a dynamoelectric machine having a magnetic core with slots containing the windings, the windings having the end turns extending out of an end of the slots, the end turns being spaced apart in a circumferential direction, said method comprising the steps of, selecting rigid blocks as part of said blocking means having a thickness less than the spacing between adjacent end turns, selecting conformable absorbent blocking as part of said blocking means having a thickness less than the spacing between adjacent end turns, said absorbent blocking being substantially free of varnish prior to insertion between said end turns, placing said blocking means between said spaced-apart end turns, impregnating said conformable material with varnish, and hardening said varnish in said conformable material to aid in holding captive said rigid blocks.

9. The method as set forth in claim 8, wherein each of said blocking means between adjacent end turns includes a rigid block and absorbent blocking.

10. The method as set forth in claim 8, including a shoulder on said rigid block, said absorbent blocking being larger than said rigid block to overlie said shoulder on said rigid block, and utilizing the rigidity of said rigid block to insert said blocking means between adjacent end turns with said shoulder engaging a portion of said absorbent blocking and thus aiding in the insertion of said blocking means between adjacent end turns.

11. The method as set forth in claim 8, including a leading edge on said rigid block, said absorbent blocking being larger than said rigid block to at least partially wrap around said leading edge on said rigid block, and utilizing the rigidity of said rigid block to insert said blocking means between adjacent end turns with said leading edge being first inserted between the end turns.

12. The method as set forth in claim 11, including a trailing edge on said rigid block opposite said leading edge, and grasping said rigid block near said trailing edge to insert said leading edge first between the end turns.

13. The method as set forth in claim 8, including selecting absorbent blocking having a dimension more than twice as long as the length of a rigid block, folding said absorbent blocking around a rigid block in a generally U-shape, and utilizing the rigidity of said rigid block to insert said blocking means into the space between adjacent end turns with the bight of the U-shaped absorbent blocking being the leading edge of the blocking means in the insertion between the end turns.

14. The method as set forth in claim 8, including a ring adjacent the circumference of said end turns, said placing said absorbent blocking into engagement with said ring.

15. A member for a dynamoelectric machine having a magnetic core with slots containing windings, the windings having end turns extending out of an end of the slots, and means for supporting said end turns comprising, blocking means, said end turns being spaced apart in a circumferential direction, turns, said blocking means being placed between said spaced apart end turns, said blocking means including rigid blocks each having a thickness less than the spacing between adjacent end turns, said blocking means also including conformable absorbent blocking having a compressed thickness less than the spacing between adjacent end turns and positioned between adjacent end turns, said conformable material being bent into a U-shape around a respective rigid block, a ring in said supporting means adjacent said end turns and the bight of said U-shape conformable blocking providing an insulating spacer between said rigid block and said ring, and an impregnating varnish impregnating said conformable material and hardened in place and holding captive at least part of said rigid blocks.

* * * * *